United States Patent
Marrano et al.

(10) Patent No.: US 12,486,798 B2
(45) Date of Patent: Dec. 2, 2025

(54) VARIABLE INLET GUARD SCREEN FOR AN INLET OF AN AIRCRAFT ENGINE

(71) Applicant: PRATT & WHITNEY CANADA CORP., Longueuil (CA)

(72) Inventors: Roberto Marrano, Boucherville (CA); Mark Cunningham, Montreal-West (CA); Eray Akcayoz, Côte-Saint-Luc (CA); Corentin Brette, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/481,737

(22) Filed: Oct. 5, 2023

(65) Prior Publication Data

US 2025/0116230 A1    Apr. 10, 2025

(51) Int. Cl.
*F02C 7/055*     (2006.01)
*B64D 33/02*     (2006.01)

(52) U.S. Cl.
CPC .............. *F02C 7/055* (2013.01); *B64D 33/02* (2013.01); *B64D 2033/022* (2013.01); *B64D 2033/0233* (2013.01)

(58) Field of Classification Search
None
See application file for complete search history.

(56) References Cited

U.S. PATENT DOCUMENTS

| | | | |
|---|---|---|---|
| 2,835,342 A | 5/1958 | Hockert | |
| 2,931,460 A | 4/1960 | Benjamin | |
| 8,292,978 B2 * | 10/2012 | Krahl | B01D 46/46 55/306 |
| 10,273,881 B2 | 4/2019 | Dornier et al. | |
| 10,364,746 B2 * | 7/2019 | Srinivasan | F01D 25/24 |
| 2009/0139200 A1 | 6/2009 | Colaprisco | |
| 2011/0001003 A1 * | 1/2011 | Krahl | B01D 46/0035 96/400 |
| 2016/0281601 A1 * | 9/2016 | Sirinivasan | F04D 29/701 |

FOREIGN PATENT DOCUMENTS

| | | |
|---|---|---|
| CN | 204436595 U | 7/2015 |
| EP | 2282031 A1 | 2/2011 |
| EP | 3121414 A1 | 1/2017 |
| GB | 757724 A | 9/1956 |

OTHER PUBLICATIONS

European Search report issued in counterpart EP application No. 24205035.9 on Feb. 25, 2025.

* cited by examiner

*Primary Examiner* — Juan G Flores
(74) *Attorney, Agent, or Firm* — NORTON ROSE FULBRIGHT CANADA LLP

(57) ABSTRACT

A system for an aircraft includes an aircraft engine having a central axis with a flowpath projecting into the aircraft engine from an airflow inlet. An inlet plenum at the airflow inlet extends between a front wall and a rear wall along the central axis. An inlet guard is arranged at the airflow inlet and extends across the flowpath. The inlet guard includes a first screen extending circumferentially about the central axis and axially from the front wall to the rear wall, and a second screen radially outward of the first screen and axially overlapping the first screen. An actuator is operable to move the first screen and the second screen relative to one another in one or more of a radial, axial and circumferential direction to shed ice from the inlet guard.

14 Claims, 5 Drawing Sheets

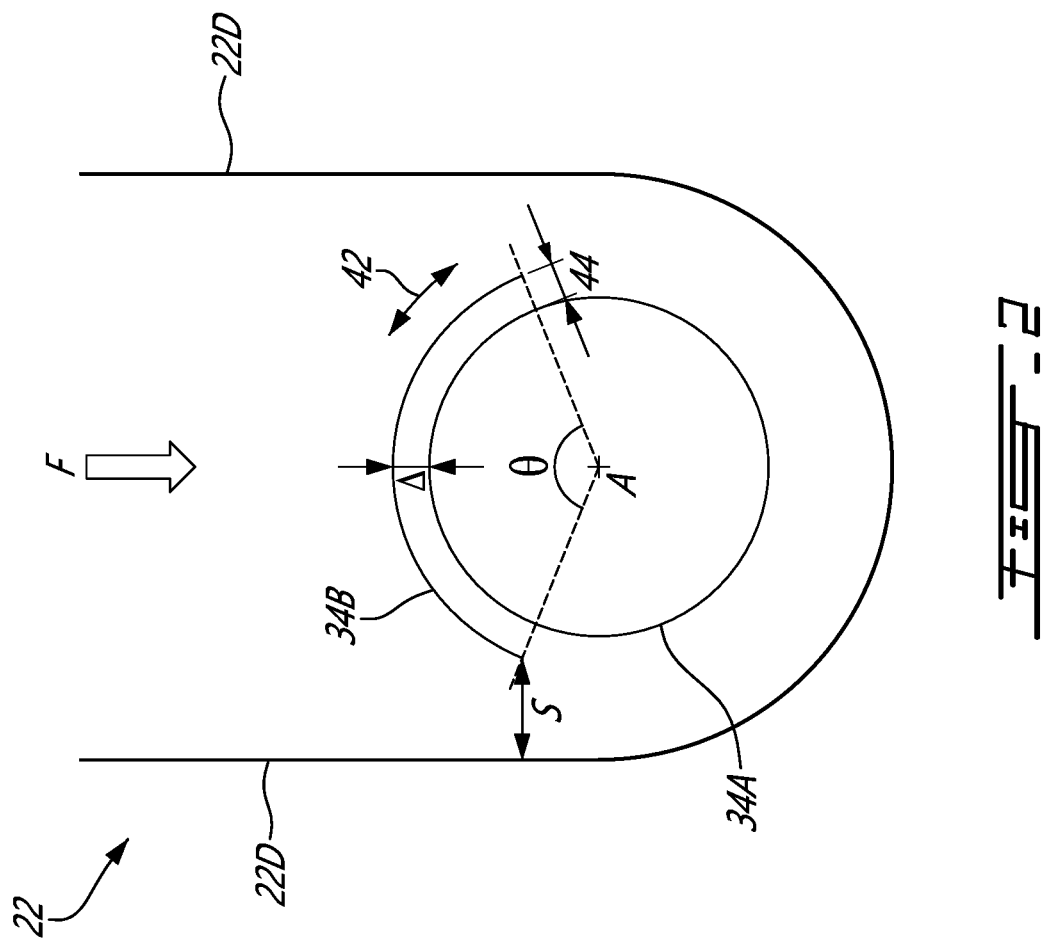

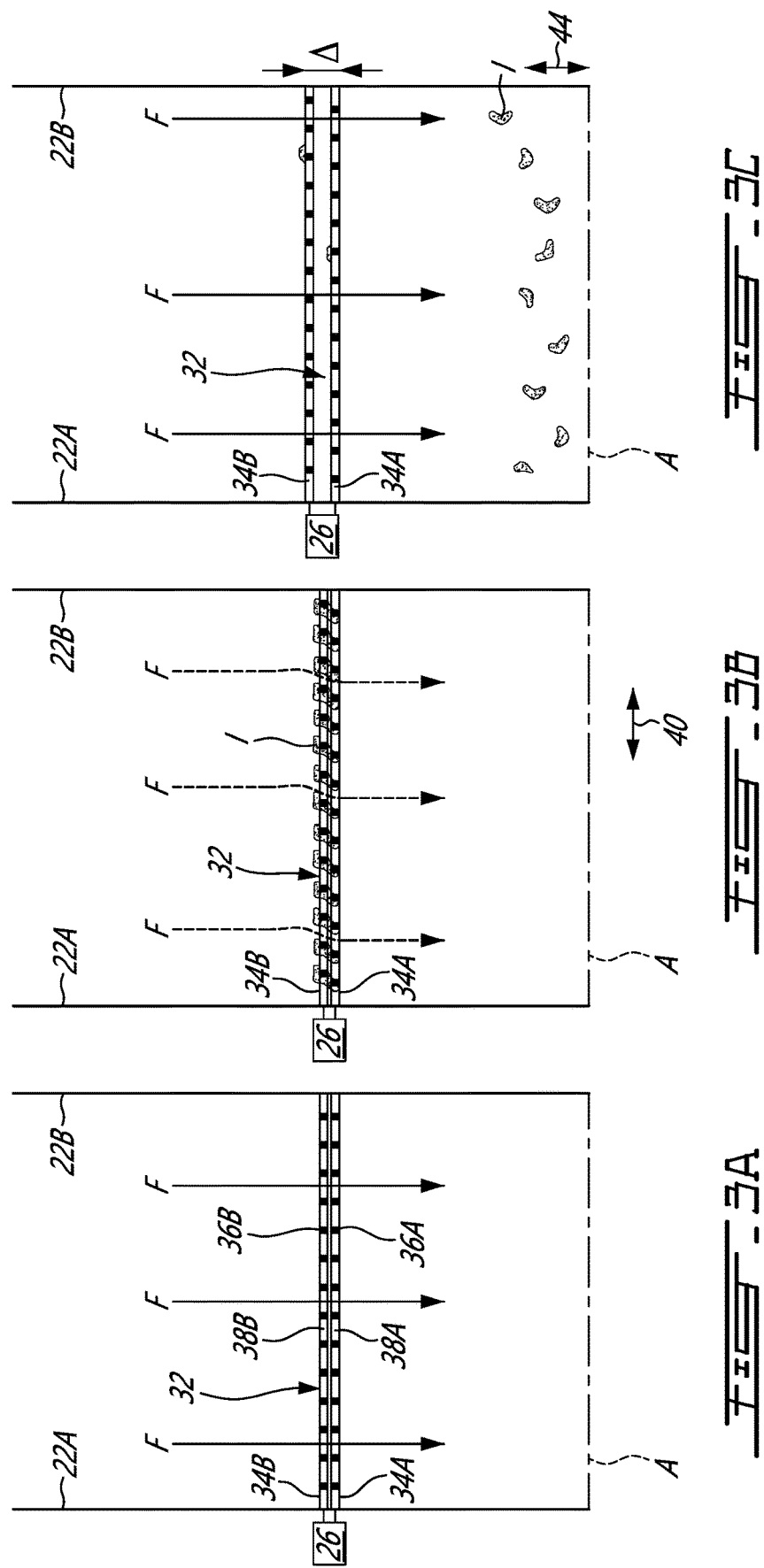

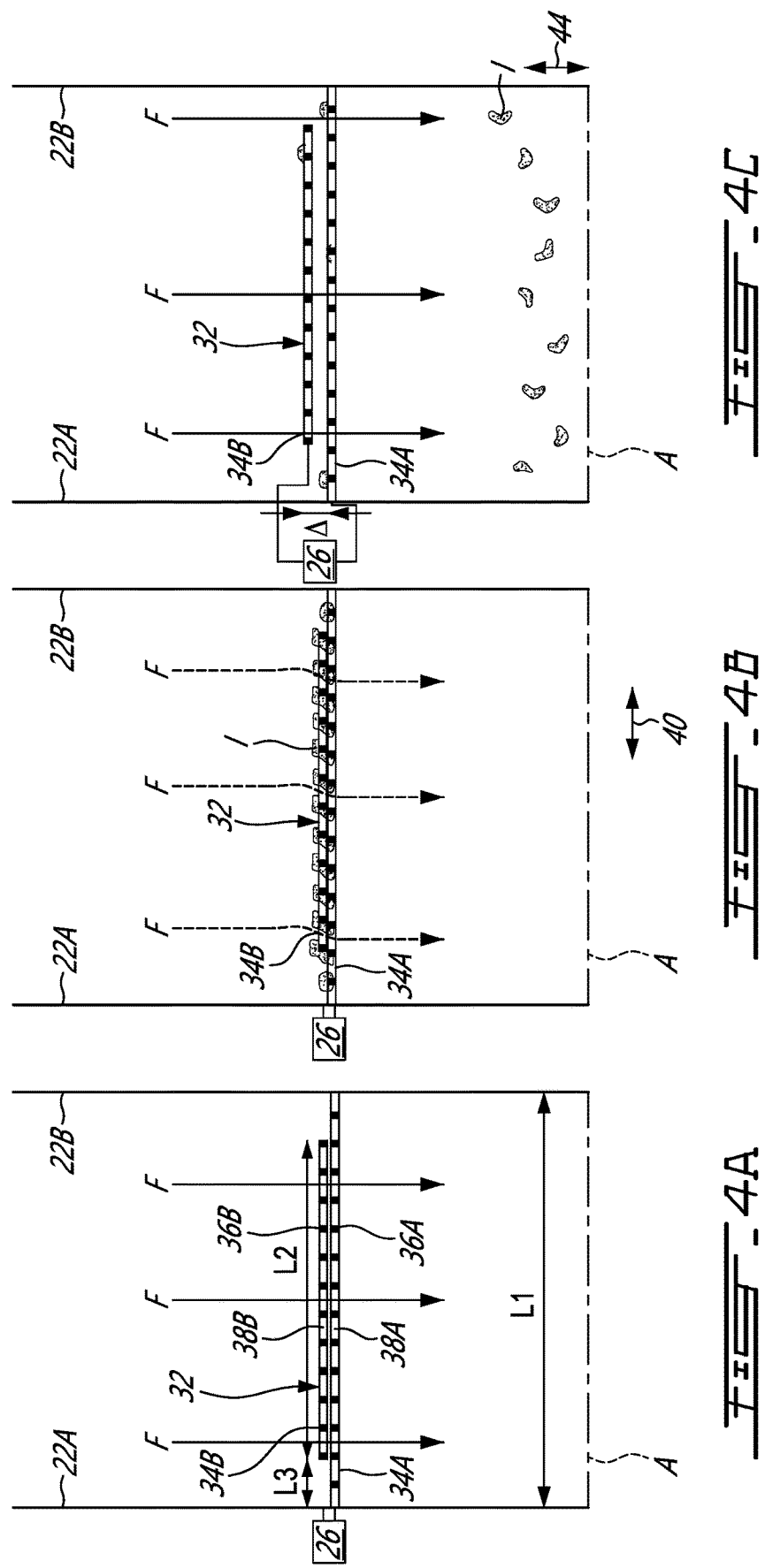

VARIABLE INLET GUARD SCREEN FOR AN INLET OF AN AIRCRAFT ENGINE

TECHNICAL FIELD

The disclosure relates generally to an aircraft engine and, more particularly, to a guard screen for an airflow inlet of the aircraft engine.

BACKGROUND

A gas turbine engine may include an inlet guard screen at an inlet into the gas turbine engine. This guard screen may prevent or reduce ingestion of foreign object debris into the gas turbine engine. While known guard screens have various advantages, there is still room in the art for improvement.

SUMMARY

In one aspect, there is provided a system for an aircraft, comprising: an aircraft engine having a central axis with a flowpath projecting into the aircraft engine from an airflow inlet; an inlet plenum at the airflow inlet extending between a front wall and a rear wall along the central axis; an inlet guard arranged at the airflow inlet and extending across the flowpath, the inlet guard including a first screen extending circumferentially about the central axis and axially from the front wall to the rear wall, and a second screen radially outward of the first screen and axially overlapping the first screen; and an actuator operable to move the first screen and the second screen relative to one another in one or more of a radial, axial and circumferential direction to shed ice from the inlet guard.

In another aspect, there is provided a system for an aircraft, comprising: an aircraft engine having a central axis including a compressor section, a flowpath projecting into the aircraft engine from an airflow inlet and through the compressor section; an inlet plenum at the airflow inlet, extending between a front wall and a rear wall along the central axis; an inlet guard extending laterally across the flowpath upstream of the compressor section, the inlet guard including first screen extending circumferentially about the central axis and axially from the first front wall to the rear wall, and a second screen disposed radially outward of the first screen, the first screen and the second screen disposed in axially overlapping relationship; and an actuator configured, subsequently to an accumulation of ice on the inlet guard, to move the first screen and the second screen relative to one another in one or more of a radial, axial and circumferential direction to shed ice from the inlet guard.

In a further aspect, there is provided a system for an aircraft, comprising: an aircraft engine having a central axis with a flowpath projecting into the aircraft engine from an airflow inlet; an inlet guard configured to reduce ingestion of foreign objects debris by the aircraft engine through the airflow inlet, the inlet guard comprising a first screen extending circumferentially about the central axis and a second screen circumferentially adjacent the first screen about the central axis and radially outward of the first screen; and an actuator operably connected to the inlet guard and configured to manipulate the inlet guard to shed accumulate ice from the inlet guard.

BRIEF DESCRIPTION OF THE DRAWINGS

Reference is now made to the accompanying figures in which:

FIG. 2 is a front schematic cross sectional view of an air inlet for a gas turbine engine;

FIGS. 3A to 3C are side schematic cross sectional views of an inlet guard in respective non-icing, icing, and de-icing states, according to an embodiment;

FIGS. 4A to 4C are side schematic cross sectional views of an inlet guard in respective non-icing, icing, and de-icing states, according to another embodiment.

DETAILED DESCRIPTION

Figure 1:
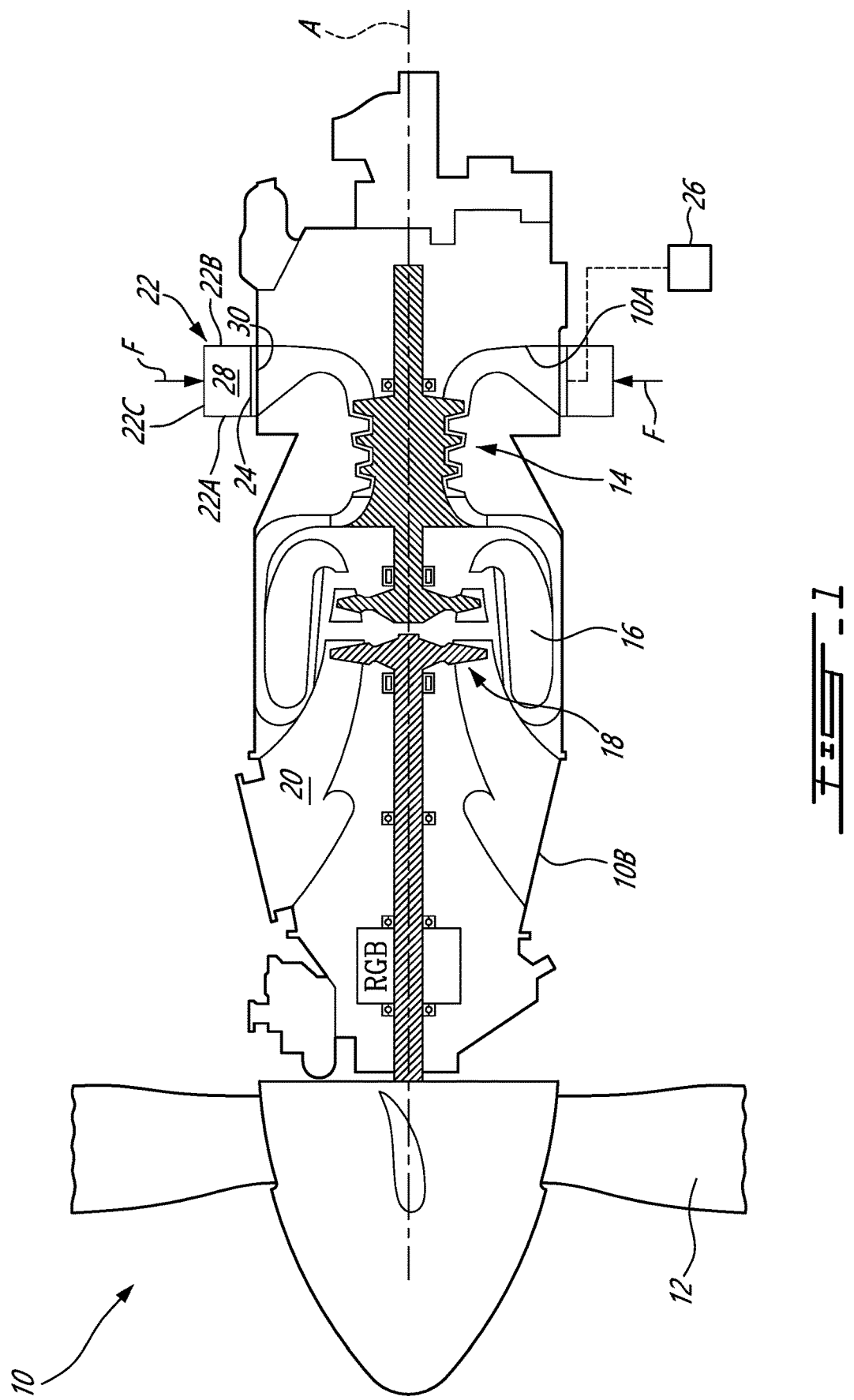
FIG. 1 is a schematic cross sectional view of a gas turbine engine.

FIG. 1 illustrates a turbine engine 10 which may for example be part of an aircraft system. Depending on the implementation of the present technology, the engine 10 could be any type of turbine engine including but not limited to a turbojet engine, a turbofan engine, a turboprop engine, and a turboshaft engine, as well as a hybrid-electric engine. In the illustrated example, the engine 10 is of the turboprop type and generally comprises in serial flow communication, along central axis A, a propeller 12, an inlet duct 10A, a compressor section 14 for pressurizing air drawn from the inlet duct 10A, a combustor section 16 in which the compressed air is mixed with fuel and ignited for generating an annular stream of hot combustion gases, and a turbine section 18 for extracting energy from the combustion gases ultimately expelled through an exhaust duct 10B. A flow path 20 of the engine 10 having opposite ends defined respectively by the inlet duct 10A and the exhaust duct 10B and into which compressor and turbine rotor discs of the compressor and turbine sections 14, 18 extend.

The engine 10 includes an (e.g., annular) airflow inlet structure 22, an inlet guard 24 (e.g., an inlet screen assembly) and an actuator 26 for actuating movement of the inlet guard 24. The inlet structure 24 is configured to direct air into the engine 10 from an environment external to aircraft. This inlet structure 22 may be configured as a standalone structure. Alternatively, the inlet structure 22 may be configured as a part of a housing structure for the engine 10 and/or one or more other components of the aircraft.

The inlet structure 22 includes a (e.g., annular) first or front wall 22A and a (e.g., annular) second or rear wall 22B. Each of these inlet structure walls 22A and 22B extends circumferentially about (e.g., completely around) the engine 10. The front wall 22A is spaced axially along the axis A from the rear wall 22B, thereby providing the inlet structure 22 with an inlet plenum 28; e.g., an internal volume such as an annular cavity. This inlet plenum 28 extends axially along the axis A within the inlet structure 22 between and to the front wall 22A and the rear wall 22B. The inlet plenum 28 extends radially inward (relative to the axis A) within the inlet structure 22 to the gas turbine engine 10 and, more particularly, to an airflow inlet 30 into the engine 10. This engine inlet 30 may be an opening (e.g., an annular orifice) in an outer case of the engine 10 that houses the compressor section 14, the combustor section 16, and turbine section 18.

Under certain circumstances, the air entering the flowpath F through the structure inlet 22C (i.e., ingested by the structure inlet 22C) may include foreign object debris. For example, during winter aircraft operation, some or all of an ice accumulation on an exterior surface of the aircraft may break off and be ingested by the flowpath F through the structure inlet 22C. Large pieces of ice may cause damage to the engine 10 (e.g., to the blades of the compressor rotor and/or vanes within the compressor section 14) if allowed to move freely with the incoming air along the flowpath F into the engine 10 and its compressor section 14. Other relatively large foreign object debris such as a bird may also cause damage to the engine 10 (e.g., to the blades of the compressor rotor and/or vanes within the compressor section 14) if allowed to move freely with the incoming air along the flowpath F into the engine 10 and its compressor section 14.

To prevent or reduce foreign object debris related damage, the inlet guard 24 is arranged along the flowpath F (e.g., anywhere) longitudinally upstream of the compressor section 14 and its compressor rotor. The inlet guard 24 of FIG. 1, for example, is arranged at (e.g., on, adjacent or proximate) the engine inlet 30. More particularly, the inlet guard 24 of FIG. 1 is disposed in (or adjacent) the inlet plenum 28 radially outboard of (or inline with) the engine inlet 30. This inlet guard 24 extends at least partially axially across the flowpath F from the front wall 22a to the rear wall 22b. The inlet guard 24 also extends circumferentially about (e.g., completely around) the axis A. The inlet guard 24 of FIG. 1 thereby laterally overlaps (e.g., completely axially and/or circumferentially covers) the engine inlet 30. This inlet guard 24 includes a plurality of perforations 32 (see FIGS. 2 and 3). These perforations 32 fluidly couple a portion of the flowpath F longitudinally upstream of (e.g., radially outboard of) the inlet guard 24 with a portion of the flowpath F longitudinally downstream of (e.g., radially inboard of) the inlet guard 24. With this arrangement, the inlet guard 24 filters (e.g., all of) the air flowing longitudinally within the flowpath F before entering the compressor section 14 and, more generally, the engine 10. The inlet guard 24 may thereby block the foreign object debris from moving along the flowpath F into the engine 10 and its compressor section 14.

Referring to FIGS. 2-4C, the inlet guard 24 includes a first or downstream screen 34A and a second or upstream screen 34B axially overlapping the first screen 34A. Each of the inlet guard screens 34A, 34B (generally referred to as "34") includes a plurality of screen elements 36A, 36B (generally referred to as "36"); e.g., elongated members, ligaments, etc. These screen elements 36 are arranged in a porous web structure; e.g., a lattice structure. The screen elements 36, for example, are woven together or otherwise arranged and interconnected into a mesh that at least partially or completely forms the respective inlet guard screen 34. With this arrangement, each inlet guard screen 34A, 34B is formed with a plurality of windows 38A, 38B (generally referred to as "38"); e.g., through-holes, ports, etc. Each of these windows 38A, 38B may be formed by and extend axially between a respective axially adjacent pair of the screen elements 36A, 36B. Each of the windows 38A, 38B may also be formed by and extend circumferentially between a respective circumferentially adjacent pair of the screen elements 36A, 36B. Each window 38 may have a polygonal (e.g., rectangular) cross-sectional geometry when viewed, for example, in a reference plane perpendicular to a centerline of the respective window 38. The cross-sectional geometry (e.g., shape, size, etc.) of each window 38 in the first screen 34A may be the same as the cross-sectional geometry (e.g., shape, size, etc.) of each window in the second screen 34B. Alternatively, the cross-sectional geometries of the windows 38 in the same inlet guard screen 34 and/or between the inlet guard screens 34 may be varied. The present disclosure, however, is not limited to such exemplary relationships between the inlet guard screens 34 nor to such exemplary window geometries.

Each of the depicted of the inlet guard screens 34 may extend laterally (e.g., axially and/or circumferentially) across the flowpath F. The first screen 34A of FIGS. 2 and 3 is disposed longitudinally downstream of (e.g., radially inboard of) the second screen 34B. In the embodiments shown in FIGS. 3A and 4A, which may be referred to as a non-icing condition or state in which ice I has not and/or is not likely to build up or accrete on the inlet guard 24, the first screen 34A is disposed longitudinally (e.g., radially) adjacent the second screen 34B, where the inlet guard screens 34 may engage (e.g., contact) one another or may be (e.g., slightly) spaced from one another. In addition, in the inlet guard's 24 non-icing condition, the windows 38A, 38B may be aligned to maximize the cross-sectional area through each of the perforations 32 and minimize pressure losses in the flowpath F. This may be referred to as an open arrangement.

FIGS. 3B and 4B show an icing state or condition, also referred to as an ice formation state or condition, whereby ice I begins to accrete or accumulate on the inlet guard 24. In the shown embodiment, although not necessarily the case in all embodiments, the actuator 26 is configured to laterally move (e.g., translate, slide, rotate, etc.) one or more of the inlet guard screens 34 between the open arrangement of FIGS. 3A and 4A and a partially-overlapping or misaligned arrangement shown in FIGS. 3B and 4B. The inlet guard screen(s) 34 may, for example, may be moved along a first lateral direction 40; e.g., axially along the axis A (as shown in FIGS. 3B and 4B). The inlet guard screen(s) 34 may also or alternatively be moved along a second lateral direction 42 (e.g., circumferentially about the axis A), which second lateral direction 42 is angularly offset from (e.g., perpendicular to, acutely angled to, etc.) the first lateral direction 40. For ease of description, the actuator 26 is described below as laterally moving the second screen 34B relative to the first screen 34A, and the first screen 34A is described as being a stationary screen. The actuator 26, however, may alternatively be configured to laterally move the first screen 34A relative to the second screen 34B, and the second screen 34B may be the stationary screen. Still alternatively, the actuator 26 may be configured to laterally move both the first screen 34A and the second screen 34B one or more common (the same) or different (e.g., angularly offset) lateral directions (e.g., 40 and/or 42).

The inlet guard screens 34 and their screen elements 36 collectively form the perforations 32 through the inlet guard 24, projecting through the screens 34A, 34B. For example, when each downstream window 38A is completely (or substantially) aligned with a respective one of the upstream windows 38B (e.g., see FIGS. 3A and 4A), each aligned pair of windows 38A and 38B may form a respective one of the perforations 32. However, when each downstream window 38A is partially offset from (e.g., slightly misaligned with) a respective one of the upstream windows 38B (e.g., see FIGS. 3B and 4B), each perforation 32 may be located between and laterally (e.g., axially or circumferentially) bound by a respective one of the downstream screen elements 36A of the first screen 34A and a respective laterally adjacent one of the upstream screen element 36B of the second screen 34B. The geometries (e.g., shapes, sizes, etc.) of the perforations 32 may thereby be changed by laterally moving the inlet guard screens 34A and 34B relative to one another to align and misalign the windows 38A and 38B. For example, the shapes of the perforations 32 with the open inlet guard screen arrangement of FIGS. 3A and 4A are different than the shapes of the perforations 32 with the various misaligned inlet guard screen arrangements of FIGS. 3B and 4B. In another example, the sizes of the perforations 32 with the open inlet guard screen arrangement of FIGS. 3A and 4A are different than the sizes of the perforations 32 with the misaligned arrangements of FIGS. 3B and 4B.

When the inlet guard screens 34 are in the open arrangement of FIGS. 3A and 4A, each of the downstream windows 38A in the first screen 34A may be completely (or substantially) laterally aligned with a respective one of the upstream windows 38B in the second screen 34B. Similarly, each of the upstream windows 38B in the second screen 34B may be completely (or substantially) laterally aligned with a respective one of the downstream windows 38A in the first screen 34A. However, when the inlet guard screens 34 are in the misaligned arrangement of FIG. 3B/4B, each of the downstream windows 38A in the first screen 34A is partially laterally aligned with (e.g., partially offset from) at least one or more of the upstream windows 38B in the second screen 34B. Similarly, each of the upstream windows 38B in the second screen 34B is partially laterally aligned with (e.g., partially offset from) at least one or more of the downstream windows 38A in the first screen 34A. As such, the flowpath F through each perforation 32 is skewed, causing the ice I to collectively accrete on both the first screen 34A and the second screen 34B.

Referring to FIGS. 3C and 4C, a de-icing state or condition is shown. Once a sufficient quantity of ice I has accreted or accumulated on the inlet guard 24, the actuator 26 is configured to move one or more of the inlet guard screens 34 in one or more directions relative to one another to shed the ice I. In the embodiments shown in FIGS. 3C and 4C, the inlet guard screen(s) are illustratively shown to in a radial direction 44 relative to the axis A by an amplitude A sufficient to break the accreted ice. Additionally or alternatively, the inlet guard screen(s) 34 may be moved along the first lateral direction 40 and/or the second lateral direction 42 to break the accreted ice. Various combinations of movements in different directions (i.e., radial, axial and circumferential) may be contemplated to break the accreted ice. As the ice I may have accreted on both the first screen 34A and the second screen 34B, the movement of the screen(s) relative to each other may separate this accreted ice, thereby breaking the accreted ice. After the de-icing is complete, the screens 34A, 34B may be returned, via the actuator, to their non-icing state or to the icing state.

The actuator 26 may actuate the inlet guard 24 based on various operational parameters. These operational parameter may include, but are not limited to, likelihood of encountering foreign object debris, likelihood of encountering icing conditions, airflow requirements to the engine 10, the presence of ice as detected by one or more sensors, etc. For example, when the aircraft is flying at cruise, there may be a relatively low likelihood of ingesting foreign object debris into the flowpath F. The inlet guard screens 34 may therefore be disposed in the open arrangement of FIGS. 3A and 4A to increase the perforation size and thereby increase airflow/decrease resistance across the inlet guard 24. By contrast, when the aircraft is taking off or landing and/or there is a high likelihood of icing, there may be a relatively high likelihood of ingesting foreign object debris into the flowpath F. The inlet guard screens 34 may therefore be disposed in a misaligned arrangement of FIGS. 3B and 4B to increase the likelihood of ice bridging between both screens. Moreover, when there is a high likelihood of forming ice accretions on the inlet guard 24, the actuator 26 may periodically move (e.g., shift) the inlet guard screens 34 relative to one another to shed and/or breakup an ice accretions on the inlet guard 24. The relative movement between the inlet duct screens may thereby at least partially restore or maintain an open area of the inlet guard 24. In other cases, transitioning between the various states may be manually accomplished, for instance via pilot control. In some cases, the operation of the actuator 26 may be tied to other aircraft anti-icing systems. In other cases, the actuator 26 may be independently controllable, for instance automatically or manually by a pilot. Other control mechanisms for the actuator 26 may be contemplated.

Referring to FIG. 2, in the shown embodiment, the first screen 34A is shown to have a full hoop (e.g., tubular body), while the second screen 34B is formed of an arcuate segment spanning a predetermined angle θ about the central axis. In various embodiments, the angle θ may be between 20 degrees and 360 degrees (i.e., a full hoop). Other angles may be contemplated. In other embodiments, the first screen 34A and/or the second screen 34B may be configured into multiple arcuate segments. As shown in FIG. 2, a minimum clearance S may be formed between the second screen 34B and the side walls 22D of the inlet structure 22.

Referring to FIGS. 3A-3C, in an embodiment, each of the first screen 34A and the second screen 34B extend axially from the first wall 22A to the second wall 22B. Referring to FIGS. 4A-4C, in another embodiment, the first screen 34A extends axially from the first wall 22A to the second wall 22B, having a first screen axial width L1, while the second screen 34B has a second screen axial width L2 lesser than the first screen axial width L1 and, as such, does not fully extend axially from the first wall 22A to the second wall 22B. In the shown case, the second screen 34B is axially centered between the first wall 22A and the second wall 22B (i.e., an axial spacing L3 between edges of the second screen and, respectively, the first wall 22A and the second wall 22B are equivalent). In other cases, the second screen 34B may be disposed closer, and may even be coupled to, one of the first wall 22A or the second wall 22B. In some cases, the ratio between the second screen axial width L2 and the first screen axial width L1 may be between about 0.2 and 1 (i.e., the embodiment shown in FIGS. 3A-3C). In some cases, the quotient between the axial spacing L3 (i.e., between an edge of the second screen 34B and the first wall 22A or the second wall 22B) and the axial length of the first screen 34A may be between 0 (i.e., the embodiment shown in FIGS. 3A-3C) and about 0.8. Other values for these parameters may be contemplated.

Figure 5B:
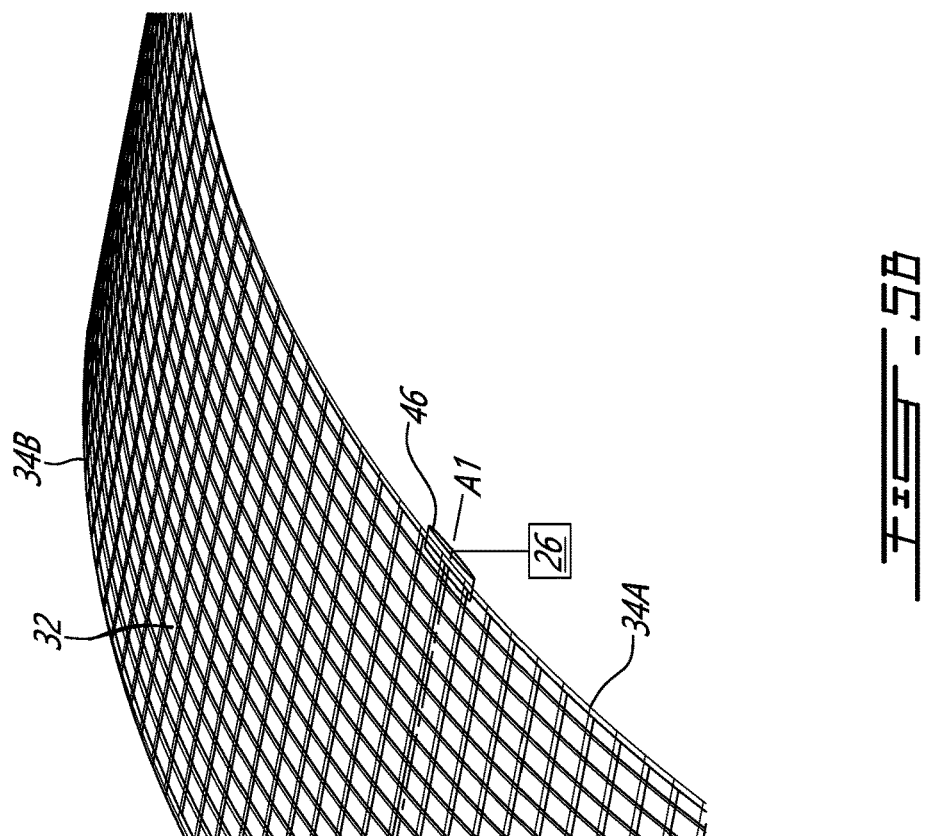
FIGS. 5A and 5B are enhanced, perspective views of inlet guard screens.
Figure 5A:
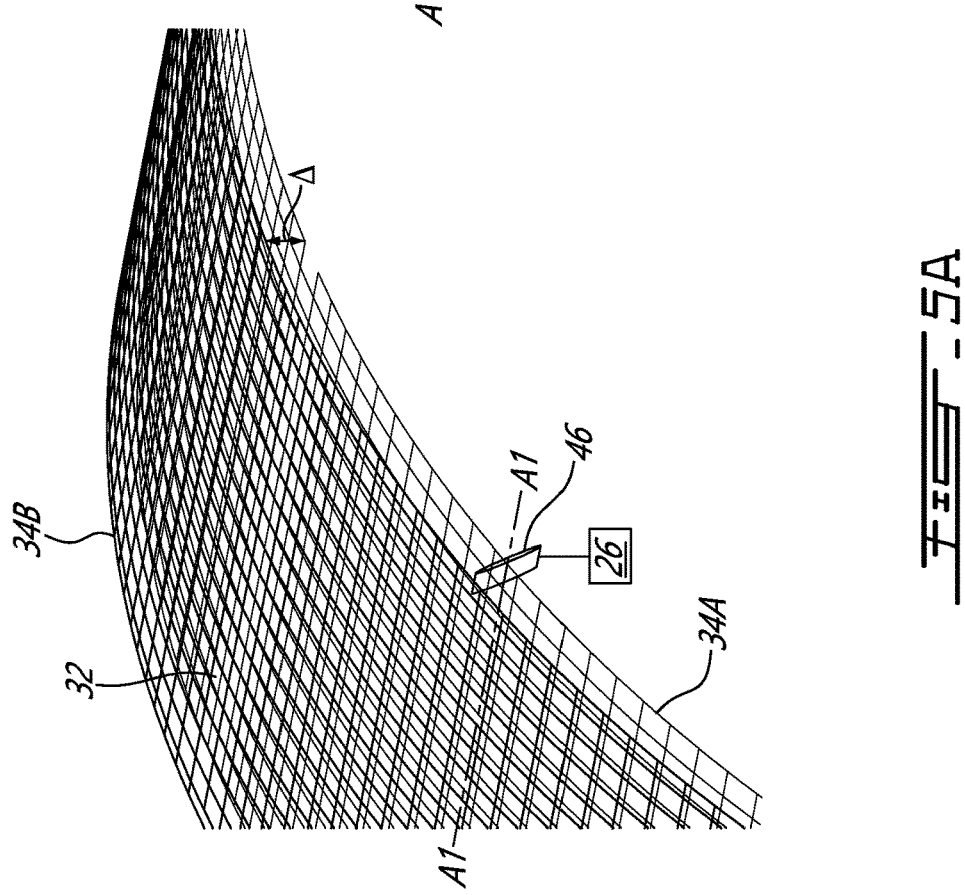

Referring to FIGS. 5A-5B, an exemplary actuator 26 is shown. In the shown case, the actuator 26 includes a rotating actuator 46 operatively coupled to the first screen 34A and/or the second screen 34B. As the rotating actuator 46 rotates about an actuator axis A1 (e.g., as it is rotatably driven by an electric motor (not shown)), the rotating actuator 46 varies the spacing (i.e., by amplitude A) between the screens 34A, 34B to shed the accreted ice. Illustratively, FIG. 5A shows the screens 34A, 34B at their maximum radial distance from each other, whereas FIG. 5B shows the screens 34A, 34B at their minimum radial distance from each other. Other actuators, such as a servo motor-type actuator, may be contemplated.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein (such as, for example only, the above-noted ranges for the ratios L3/L1 and L2/L1), include (s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, in some cases, the actuator 26 may forego the misalignment state shown in FIGS. 3B and 4B, and proceed directly from the non-icing state to the de-icing state once a sufficient quantity of ice has accreted on the inlet guard 24. Additionally or alternatively, the first screen 34A could be formed of a more rigid material than the second screen 34B, allowing the second screen 34B to more easily displace relative to the first screen 34A. Yet further modifications could be implemented by a person of ordinary skill in the art in view of the present disclosure, which modifications would be within the scope of the present technology.

The invention claimed is:

1. A system for an aircraft, comprising:
an aircraft engine having a central axis with a flowpath projecting into the aircraft engine from an airflow inlet;
an inlet plenum at the airflow inlet extending between a front wall and a rear wall along the central axis;
an inlet guard arranged at the airflow inlet and extending across the flowpath, the inlet guard including a first screen extending circumferentially about the central axis and axially from the front wall to the rear wall, and a second screen radially outward of the first screen and axially overlapping the first screen; and
an actuator operable to move the first screen and the second screen relative to one another in a radial direction to shed ice from the inlet guard;
wherein a radial distance between the first screen and the second screen is minimized in a non-icing condition.

2. The system as defined in claim 1, wherein a plurality of perforations project through the inlet guard and are formed by the first screen and the second screen, and the actuator is further operable to move the first screen and the second screen relative to one another in one or more of an axial direction and a circumferential direction to change a geometry of the plurality of perforations.

3. The system as defined in claim 2, wherein a cross-sectional area through each of the plurality of perforations is maximized in the non-icing condition.

4. The system as defined in claim 1, wherein the actuator is operable to periodically move the first screen and the second screen relative to one another in the radial direction.

5. The system as defined in claim 1, wherein the first screen has a first screen axial width L1 extending from the front wall to the rear wall and the second screen is spaced apart from the front wall or the rear wall by an axial width L3, and wherein:

$$0 \le L3/L1 \le 0.8.$$

6. The system as defined in claim 1, wherein the first screen has a first screen axial width L1 extending from the first wall to the rear wall and the second screen has a second screen axial width L2, and wherein:

$$0.2 \le L2/L1 \le 1.$$

7. The system as defined in claim 1, wherein the second screen is formed of an arcuate segment with an angle between 20 and 360 degrees about the central axis.

8. The system as defined in claim 1, wherein the actuator is operable to move the second screen relative to the first screen.

9. A system for an aircraft, comprising:
an aircraft engine having a central axis including a compressor section, a flowpath projecting into the aircraft engine from an airflow inlet and through the compressor section;
an inlet plenum at the airflow inlet, extending between a front wall and a rear wall along the central axis;
an inlet guard extending laterally across the flowpath upstream of the compressor section, the inlet guard including a first screen extending circumferentially about the central axis and axially from the front wall to the rear wall, and a second screen disposed radially outward of the first screen, the first screen and the second screen disposed in axially overlapping relationship; and
an actuator configured, subsequently to an accumulation of ice on the inlet guard, to move the first screen and the second screen relative to one another in one or more of a radial, axial and circumferential direction to shed ice from the inlet guard;
wherein the first screen has a first screen axial width L1 extending from the front wall to the rear wall and the second screen has a second screen axial width L2, wherein:

$$0.2 \le L2/L1 < 1;$$

wherein a plurality of perforations project through the inlet guard and are formed by the first screen and the second screen, and the actuator is further configured, as the ice accumulates on the inlet guard, to move the first screen and the second screen relative to one another in one or more of the axial direction and the circumferential direction to change a geometry of the plurality of perforations and wherein a cross-sectional area through each of the plurality of perforations is maximized in a non-icing condition.

10. The system as defined in claim 9, wherein the actuator is configured to periodically move the first screen and the second screen relative to one another in one or more of the axial and the circumferential direction.

11. The system as defined in claim 9, wherein the second screen is spaced apart from the front wall or the rear wall by an axial width L3, and wherein:

$$0 \le L3/L1 \le 0.8.$$

12. The system as defined in claim 9, wherein the second screen is formed of an arcuate segment with an angle between 20 and 360 degrees about the central axis.

13. The system as defined in claim 9, wherein the actuator is operably connected to the second screen to move the second screen relative to the first screen.

14. A system for an aircraft, comprising:
an aircraft engine having a central axis with a flowpath projecting into the aircraft engine from an airflow inlet;
an inlet guard configured to reduce ingestion of foreign objects debris by the aircraft engine through the airflow inlet, the inlet guard comprising a first screen extending circumferentially about the central axis and a second screen circumferentially adjacent the first screen about the central axis and radially outward of the first screen, the first screen and the second screen each including screen elements arranged into a mesh; and
an actuator operably connected to the inlet guard and configured to manipulate the inlet guard to engage the screen elements of the first screen with the screen elements of the second screen to shed accumulated ice from the inlet guard;
wherein the actuator is configured for moving the first screen and the second screen relative to one another in a radial direction.

* * * * *